US012374305B2

(12) United States Patent
Lu et al.

(10) Patent No.: US 12,374,305 B2
(45) Date of Patent: Jul. 29, 2025

(54) DISPLAY DEVICE AND DRIVING MEHTOD THEREOF INCLUDING VOLTAGE ADJUSTMENT

(71) Applicants: Huizhou China Star Optoelectronics Display Co., Ltd., Guangdong (CN); Shenzhen China Star Optoelectronics Semiconductor Display Technology Co., Ltd., Guangdong (CN)

(72) Inventors: Xiaobing Lu, Guangdong (CN); Xiaolong Chen, Guangdong (CN)

(73) Assignees: Huizhou China Star Optoelectronics Display Co., Ltd., Huizhou (CN); Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/769,816

(22) PCT Filed: Jan. 20, 2022

(86) PCT No.: PCT/CN2022/073006
§ 371 (c)(1),
(2) Date: Apr. 18, 2022

(87) PCT Pub. No.: WO2023/103154
PCT Pub. Date: Jun. 15, 2023

(65) Prior Publication Data

US 2024/0135895 A1 Apr. 25, 2024
US 2024/0233670 A9 Jul. 11, 2024

(30) Foreign Application Priority Data

Dec. 7, 2021 (CN) ......................... 202111485219.1
Jan. 11, 2022 (CN) ......................... 202210027913.7

(51) Int. Cl.
*G09G 3/36* (2006.01)
*G09G 3/20* (2006.01)

(52) U.S. Cl.
CPC ......... *G09G 3/3614* (2013.01); *G09G 3/2007* (2013.01); *G09G 3/3607* (2013.01);
(Continued)

(58) Field of Classification Search
CPC ............... G09G 3/3614; G09G 3/3607; G09G 2320/0247; G09G 2320/0673; G09G 2330/021
See application file for complete search history.

(56) References Cited

U.S. PATENT DOCUMENTS 10,417,995 B2 9/2019 Xu
11,151,941 B1 10/2021 Shikata et al.
(Continued)

FOREIGN PATENT DOCUMENTS

CN 101075415 11/2007
CN 101615382 12/2009
(Continued)

OTHER PUBLICATIONS

International Search Report and the Written Opinion Dated Aug. 25, 2022 From the International Searching Authority Re. Application No. PCT/CN2022/072941 and Its Translation Into English. (17 Pages).

(Continued)

*Primary Examiner* — Kwang-Su Yang

(57) ABSTRACT

The disclosure relates to a method of driving a display and the display, wherein the driving method includes: determining a grayscale extreme value corresponding to a polarity of display data of a target frame image according to the polarity; adjusting a voltage value of a first power supply voltage of the display according to the grayscale extreme
(Continued)

value to obtain a voltage value of a second power supply voltage; and driving the display for displaying according to the voltage value of the second power supply voltage and the display data of the target frame image.

20 Claims, 3 Drawing Sheets

(52) U.S. Cl.
CPC ............... *G09G 2320/0247* (2013.01); *G09G 2320/0276* (2013.01); *G09G 2320/0673* (2013.01); *G09G 2330/021* (2013.01); *G09G 2330/023* (2013.01); *G09G 2330/028* (2013.01)

(56) References Cited

U.S. PATENT DOCUMENTS

| | | | | |
|---|---|---|---|---|
| 2008/0238850 | A1* | 10/2008 | Watanabe | G09G 3/3659 345/90 |
| 2012/0256936 | A1* | 10/2012 | Lee | G09G 3/3225 345/549 |
| 2013/0127923 | A1 | 5/2013 | An et al. | |
| 2013/0147861 | A1* | 6/2013 | Kim | G09G 3/3688 345/690 |
| 2016/0042687 | A1 | 2/2016 | Jeong et al. | |
| 2021/0319740 | A1 | 10/2021 | Pyun et al. | |

FOREIGN PATENT DOCUMENTS

| | | |
|---|---|---|
| CN | 101673064 | 10/2010 |
| CN | 102024440 | 4/2011 |
| CN | 102737577 | 10/2012 |
| CN | 102750927 | 10/2012 |
| CN | 102956173 | 3/2013 |
| CN | 103165066 | 6/2013 |
| CN | 103680401 | 3/2014 |
| CN | 103680431 | 3/2014 |
| CN | 103956143 | 7/2014 |
| CN | 104200785 | 12/2014 |
| CN | 104240661 | 12/2014 |
| CN | 105118437 | 12/2015 |
| CN | 105262964 | 1/2016 |
| CN | 105528994 | 4/2016 |
| CN | 105895044 | 8/2016 |
| CN | 106324875 | 1/2017 |
| CN | 106847198 | 6/2017 |
| CN | 106847217 | 6/2017 |
| CN | 107065252 | 8/2017 |
| CN | 107068098 | 8/2017 |
| CN | 107316608 | 11/2017 |
| CN | 108665844 | 10/2018 |
| CN | 108932936 | 12/2018 |
| CN | 108986762 | 12/2018 |
| CN | 109308883 | 2/2019 |
| CN | 109859670 | 6/2019 |
| CN | 109872701 | 6/2019 |
| CN | 110111731 | 8/2019 |
| CN | 111415616 | 7/2020 |
| CN | 111968567 | 11/2020 |
| CN | 112289254 | 1/2021 |
| CN | 112382247 | 2/2021 |
| CN | 213025334 | 4/2021 |
| CN | 114360427 | 4/2022 |
| CN | 114360428 | 4/2022 |
| CN | 114787904 | 7/2022 |
| EP | 3392870 | 10/2018 |
| JP | 06-332409 | 12/1994 |
| JP | 09-81081 | 3/1997 |
| JP | 2011-077932 | 4/2011 |
| KR | 10-2012-0074915 | 7/2012 |

OTHER PUBLICATIONS

International Search Report and the Written Opinion Dated Aug. 25, 2022 From the International Searching Authority Re. Application No. PCT/CN2022/073006 and Its Translation Into English. (17 Pages).

International Search Report and the Written Opinion Dated Aug. 29, 2022 From the International Searching Authority Re. Application No. PCT/CN2021/138669 and Its Translation Into English. (20 Pages).

International Search Report and the Written Opinion Dated Aug. 31, 2022 From the International Searching Authority Re. Application No. PCT/CN2022/073599 and Its Translation Into English. (17 Pages).

Notification of Office Action and Search Report Dated Sep. 26, 2022 From The State Intellectual Property Office of the People's Republic of China Re. Application No. 202210027913.7 and Its Translation Into English. (15 Pages).

Notification of Office Action and Search Report Dated Apr. 27, 2023 From The State Intellectual Property Office of the People's Republic of China Re. Application No. 202210027913.7 and Its Translation Into English. (18 Pages).

Notification of Office Action and Search Report Dated Apr. 28, 2023 From The State Intellectual Property Office of the People's Republic of China Re. Application No. 202210027929.8 and Its Translation Into English. (26 Pages).

Notification of Office Action and Search Report Dated Apr. 28, 2023 From The State Intellectual Property Office of the People's Republic of China Re. Application No. 202210027960.1 and Its Translation Into English. (27 Pages).

Notification of Office Action and Search Report Dated Jun. 28, 2024 From The State Intellectual Property Office of the People's Republic of China Re. Application No. 202180006041.X and Its Translation Into English. (17 Pages).

* cited by examiner

DISPLAY DEVICE AND DRIVING MEHTOD THEREOF INCLUDING VOLTAGE ADJUSTMENT

RELATED APPLICATIONS

This application is a National Phase of PCT Patent Application No. PCT/CN2022/073006 having International filing date of Jan. 20, 2022, which claims the benefit of priority Chinese Patent Application Nos. 202111485219.1 filed on Dec. 7, 2021 and 202210027913.7 filed on Jan. 11, 2022. The contents of the above applications are all incorporated by reference as if fully set forth herein in their entirety.

FIELD AND BACKGROUND OF THE INVENTION

The present disclosure relates to a field of display technology, and in particular, to a display and a method for driving same.

Display panels with large sizes, high refresh rates and high resolutions generally have excessive power consumption. Under current case of controlling ecological pollution and improving environmental influence of energy-consuming products, it is more urgent on how to reduce the power consumption of the display panels with the large sizes, high refresh rates and high resolutions.

In addition, the relevant technical solutions have issues that not only power consumption in the practical application is too large, but also the screen will flicker. Therefore, this is a pressing issue that needs to be solved in order to further reduce the power consumption of the display panel while ensuring an image performance.

SUMMARY OF THE INVENTION

The present disclosure is mainly focused on how to further reduce a power consumption of display panels while ensuring an image performance, which is a pressing issue.

In view of the above, the present disclosure proposes a display and a method for driving the same, which can dynamically and adaptively adjust a voltage value of a second power supply voltage according to a polarity of display data, thereby effectively avoiding an image flicker problem, and further reducing energy consumption of display panels while ensuring image performance.

According to an aspect of the present disclosure, provided is a method for driving a display, comprising following steps: determining a grayscale extreme value corresponding to a polarity of display data of a target frame image according to the polarity; adjusting a voltage value of a first power supply voltage of the display according to the grayscale extreme value to obtain a voltage value of a second power supply voltage; driving the display for displaying according to the voltage value of the second power supply voltage and the display data of the target frame image.

According to another aspect of the present disclosure, provided is a display comprising a grayscale acquisition module electrically connected to a power supply regulation module, configured to determine a grayscale extreme value corresponding to a polarity of display data of a target frame image according to the polarity; the power supply regulation module electrically connected to the grayscale acquisition module and a display module, and configured to adjust a voltage value of a first power supply voltage of the display according to the grayscale extreme value, to obtain a voltage value of a second power supply voltage; the display module electrically connected to the power supply regulation module, and configured to drive the display for display according to the voltage value of the second power supply voltage and the display data of the target frame image.

The various aspects of the present disclosure determine the grayscale extreme value corresponding to the polarity of display data of the target frame image according to the polarity, then adjust the voltage value of the first power supply voltage of the display according to the grayscale extreme value to obtain the voltage value of the second power supply voltage, and finally drive the display for display according to the voltage value of the second power supply voltage and the display data of the target frame image, thereby may dynamically and adaptively adjust the voltage value of the second power supply voltage according to the polarity of display data, so as to effectively avoid the image flicker problem and further reduce energy consumption of display panels while ensuring the image performance.

BRIEF DESCRIPTION OF THE SEVERAL VIEWS OF THE DRAWINGS

Specific embodiments of the present disclosure will be described in detail with reference to accompanying drawings, which can make technical solutions and other beneficial effects of the present disclosure apparent.

DESCRIPTION OF SPECIFIC EMBODIMENTS OF THE INVENTION

Figure 1:
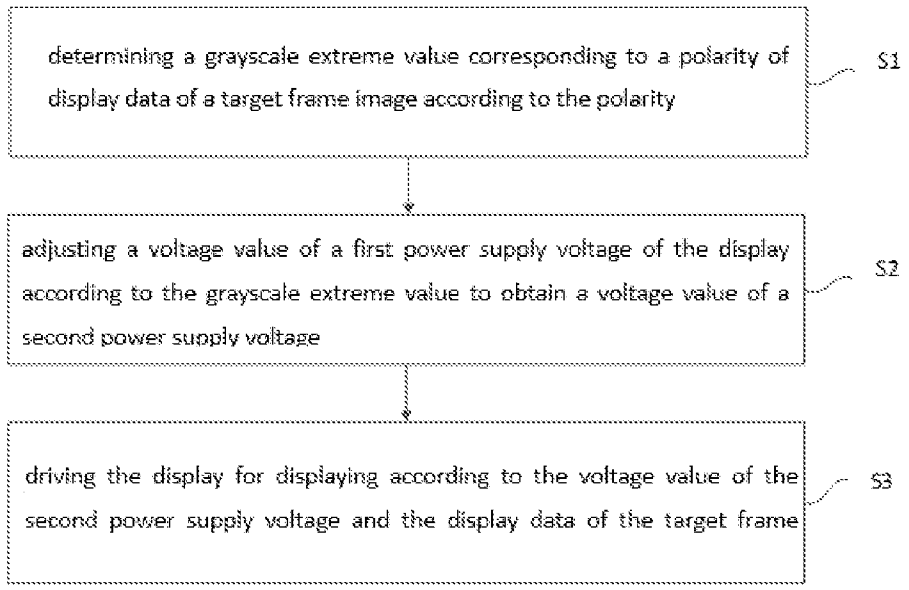
FIG. 1 is a flowchart of a method for driving a display according to an embodiment of the present disclosure.

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include one or more of the features. In the description of the present disclosure, the meaning of "plural" is two or more, unless otherwise specifically defined.

In the description of the present disclosure, it should be noted that the terms "installation", "connection" and "coupling" should be understood in a broad sense, unless otherwise clearly specified and defined. For example, it can be a fixed connection, a detachable connection, or integrated connection; it can be a mechanical connection, an electrical connection or can communicate with each other; it can be directly connected or indirectly connected through an intermediary, it can also be the connection between two elements or the interaction between two elements. Those ordinary skilled in the art can understand the specific meanings of the above terms in the present disclosure according to specific situations.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference characters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated by those skilled in the art. In some examples, methods, means, elements, and circuits well known to those skilled in the art are not described in detail in order to highlight the focus of the present disclosure.

The present disclosure mainly provides a method for driving a display, comprising following steps: determining a grayscale extreme value corresponding to a polarity of display data of a target frame image according to the polarity; adjusting a voltage value of a first power supply voltage of the display according to the grayscale extreme value to obtain a voltage value of a second power supply voltage; and driving the display for displaying according to the voltage value of the second power supply voltage and the display data of the target frame image.

Through determining the grayscale extreme value corresponding to the polarity of the display data of the target frame image according to the polarity, then adjusting the voltage value of the first power supply voltage of the display according to the grayscale extreme value to obtain the voltage value of the second power supply voltage, and finally driving the display for displaying according to the voltage value of the second power supply voltage and the display data of the target frame image, the present disclosure can dynamically and adaptively adjust the voltage value of the second power supply voltage according to the polarity of the display data, thereby effectively avoiding an image flicker problem and further reducing energy consumption of display panels while ensuring image performance.

FIG. 1 is a flowchart of a method for driving a display according to an embodiment of the present disclosure.

As shown in FIG. 1, a display of an embodiment of the present disclosure may include a drive module and a display panel, wherein the drive module is electrically connected to the display panel, and may drive the display panel. Display data of a target frame image may be pre-stored in the drive module. The method for driving the display comprises following steps:

Step S1: determining a grayscale extreme value corresponding to a polarity of display data of a target frame image according to the polarity.

Wherein the display data of the target frame image is pre-stored in the drive module. For example, a memory may be disposed in the drive module for pre-storing the display data of the target frame image. Certainly, a display image of the display panel may include a plurality of frames, and display data of all frames of the display panel may also be pre-stored in the drive module.

Further, the target frame image of the display panel includes a plurality of pixels, wherein at least one pixel is preset with a corresponding grayscale. The display data of the target frame image may be represented by a one-dimensional array or a multi-dimensional array, and each element in the array may be corresponded to each pixel of the display image, in order to drive each pixel of the display panel to display according to the preset grayscale. It is understood that how to represent the display data is not limited in the present disclosure.

Further, the step of determining the grayscale extreme value corresponding to the polarity of the display data of the target frame image according to the polarity comprises following steps:

Step S11: determining a polarity of display data of the target frame image, wherein the polarity of display data of the target frame image includes a positive polarity and a negative polarity;

Step S12: determining a first grayscale positive extreme value according to a positive polarity display data in the display data of the target frame image;

Step S13: determining a first grayscale negative extreme value according to a negative polarity display data in the display data of the target frame image.

Wherein the polarity of display data of the target frame image may include a positive polarity and a negative polarity. In an embodiment of the present disclosure, an electric field with directionality is applied to liquid crystal molecules in the display. It may be applied to the liquid crystal molecules in an opposite electric field or potential difference at different times, so as to invert the liquid crystals. As an example, when a sign of the potential difference applied to the liquid crystal molecules is positive, the polarity of the corresponding display data is positive; and when the sign of the potential difference applied to the liquid crystal molecules is negative, the polarity of the corresponding display data is negative.

It should be noted that, a pixel unit array may be disposed in the display of an embodiment of the present disclosure. The pixel unit array may include a plurality of pixel units arranged in rows and columns. Each of the pixel units may be electrically connected to a corresponding data line, and display data corresponding to an individual pixel unit is loaded into a respective pixel unit through data lines, so that the respective pixel unit emits light, thereby realizing image display. In an embodiment of the present disclosure, a fixed area may be disposed, and all data corresponding to pixel units in the fixed area have a same polarity that are inverted at a same time. That is, the embodiments of the present disclosure may be implemented using a frame inversion manner.

Further, the grayscale extreme value includes a first grayscale positive extreme value and a first grayscale negative extreme value. In an embodiment of the present disclosure, the first grayscale positive extreme value of the target frame image may be a maximum value of a plurality of first grayscales of the target frame image corresponding to a positive polarity, and the first grayscale negative extreme value of the target frame image may be a maximum value of a plurality of first grayscales of the target frame image corresponding to a negative polarity.

Further, the first grayscale may be a preset grayscale, and display data of the target frame image may include a plurality of the first grayscales, and each of the first grayscales corresponds to one pixel of the target frame image. For example, the grayscale of display data of all frames of the display panel may be represented by an eight-bit binary number and have a range of 0 to 255. For one frame of display image, the display image may include 1024*768 pixels, and the first grayscale of each pixel of the display image may range from 16 to 128. That is, for the frame of display image, a first grayscale positive extreme value of the frame of display image may be 128, which is a maximum grayscale of the frame of display image corresponding to a positive polarity; and a first grayscale negative extreme value of the frame display image may be 64, which is a maximum grayscale of the frame of display image corresponding to a negative polarity.

Further, before the step of adjusting a voltage value of a first power supply voltage according to a voltage value of a gamma reference voltage corresponding to a current polarity to obtain a voltage value of a second power supply voltage, the method further comprises following steps:

Step S14: transforming a plurality of first grayscales of the positive polarity display data to obtain a second grayscale positive extreme value corresponding to a positive polarity;

Step S15: transforming a plurality of first grayscales of the negative polarity display data to obtain a second grayscale negative extreme value corresponding to a negative polarity.

Further, the target frame image may include a plurality of first grayscales that may correspond to the positive polarity and negative polarity, so each pixel in the target frame image may correspond to one of the first grayscales. Therefore, the plurality of first grayscales of the positive polarity display data may be transformed respectively to obtain second grayscale positive extreme values corresponding to the positive polarity; while the plurality of first grayscales of the negative polarity display data are transformed to obtain second grayscale negative extreme values corresponding to the negative polarity. It is understood that the sequence of step S14 and step S15 may be reversed and is not limited here.

Further, during transformation of the plurality of first grayscales of the target frame image, the plurality of first grayscales of the target frame image may be divided into a plurality of sub-intervals, and transformed according to the plurality of sub-interval segmentations. As another example, during transformation of the plurality of first grayscales of the target frame image, only first grayscales corresponding to part of pixels in the target frame image may be transformed, while first grayscales corresponding to other pixels in the target frame image may not be transformed. It is understood that how to transform the plurality of first grayscales of the target frame image is not limited in the present disclosure.

It should be noted that a plurality of first grayscales of the target frame image may be transformed by the drive module based on a non-linear relationship between visual perception and brightness to obtain a plurality of transformed second grayscales. Wherein, the visual perception may be characterized by a lightness value that can be observed by a human eye, and the brightness may be characterized by a brightness factor. Therefore, each pixel of the target frame image may be statistically analyzed based on the non-linear relationship between the visual perception and the brightness of the image, to obtain a range of the lightness value of the target frame image. Certainly, grayscales of the target frame image may also be statistically analyzed to obtain a range of the grayscales.

Specifically, the second grayscale positive extreme value may correspond to a first grayscale before transformation corresponding to the positive polarity, and the second grayscale negative extreme value may correspond to a first grayscale before transformation corresponding to the negative polarity. It can be understood that different transformation modes may generate different correspondence between the first grayscale and the second grayscale. The present disclosure does not limit the correspondence between the first grayscale and the second grayscale.

Further, the second grayscale extreme value is a maximum value of a plurality of second grayscales of the target frame image. That is, the second grayscale positive extreme value has a similar meaning to the first grayscale positive extreme value. For example, for one frame of display image, it may include 1024*768 pixels, and each pixel of the frame of display image has a first grayscale of 16 to 128. That is, for the frame of display image, a first grayscale positive extreme value of the frame of display image may be 128, which is the maximum grayscale of the frame of display image corresponding to the positive polarity; a first grayscale negative extreme value of the frame of display image may be 64, which is the maximum grayscale of the frame of display image corresponding to the negative polarity. After the plurality of first grayscales having different polarities of the target frame image are respectively transformed, the second grayscale of the frame of display image corresponding to the positive polarity may range from 168 to 212, and the second grayscale of the frame of display image corresponding to the negative polarity may range from 108 to 168. At this time, the second grayscale positive extreme value may be 212, and the second grayscale negative extreme value may be 168.

Further, the step of transforming a plurality of first grayscales of the positive polarity display data to obtain a second grayscale positive extreme value corresponding to the positive polarity includes following steps:

Step S141: transforming the plurality of first grayscales of the positive polarity display data to obtain a plurality of transformed second grayscales corresponding to a positive polarity;

Step S142: obtaining the second grayscale positive extreme value corresponding to the positive polarity according to the plurality of transformed second grayscales corresponding to the positive polarity.

Wherein, the step of transforming the plurality of first grayscales of the positive polarity display data to obtain the plurality of transformed second grayscales corresponding to the positive polarity may include: dividing the plurality of first grayscales of the positive polarity display data into a plurality of sub-intervals; transforming the plurality of first grayscales of the positive polarity display data according to the plurality of divided sub-intervals and a preset transformation coefficient to obtain the plurality of transformed second grayscales corresponding to the positive polarity. For example, the preset transformation coefficient may be multiplied by the plurality of first grayscales of the positive polarity display data to obtain the plurality of transformed second grayscales corresponding to the positive polarity.

As an example, step S141 may be represented by a following equation (1):

$$Dout(n)_{(p)} = \begin{cases} \lambda_1 \times Din_{n(p)}, & C_0 < Din_{n(p)} < C_1 \\ \lambda_2 \times Din_{n(p)}, & C_1 < Din_{n(p)} < C_2 \\ \dots & \dots \\ \lambda_m \times Din_{n(p)}, & C_{m-1} < Din_{n(p)} < C_m \end{cases}, \quad (1)$$

Where $Din_{n(p)}$ may represent a first grayscale of an $n^{th}$ pixel before transformation corresponding to the positive polarity in the input target frame image; $\lambda_1$ may represent a coefficient corresponding to $Din_{n(p)}$ in a case that a first grayscale of the $n^{th}$ pixel in the input target frame image is in a range of $C_0$ to $C_1$; $\lambda_2$ may represent a coefficient corresponding to $Din_{n(p)}$ in the case that a grayscale of the $n^{th}$ pixel in the target frame image is in a range $C_1$ to $C_2$. By analogy, $\lambda_m$ may represent a coefficient corresponding to $Din_{n(p)}$ in a case that the grayscale of the $n^{th}$ pixel in the target frame image is in a range of $C_{m-1}$ to $C_m$. $Dout(n)_{(p)}$ may represent a transformed second grayscale of the $n^{th}$ pixel in the target frame image corresponding to the positive polarity. m may represent the number of sub-intervals. In an example, $C_0$ may be zero and $C_m$ may be 255.

Further, the step of transforming a plurality of first grayscales of the negative polarity display data to obtain a second grayscale negative extreme value corresponding to the negative polarity comprises following steps:

Step S151: transforming the plurality of first grayscales of the negative polarity display data to obtain a plurality of transformed second grayscales corresponding to a negative polarity;

Step S152: obtaining the second grayscale negative extreme value corresponding to the negative polarity according to the plurality of transformed second grayscales corresponding to the negative polarity.

As an example, step S151 may be represented by a following equation (2):

$$Dout(n)_{(n)} = \begin{cases} \lambda_1 \times Din_{n(n)}, & C_0 < Din_{n(n)} < C_1 \\ \lambda_2 \times Din_{n(n)}, & C_1 < Din_{n(n)} < C_2 \\ \dots & \dots \\ \lambda_m \times Din_{n(n)}, & C_{m-1} < Din_{n(n)} < C_m \end{cases}, \quad (2)$$

Where $Din_{n(n)}$ may represent a first grayscale of an $n^{th}$ pixel before transformation corresponding to the negative polarity in the input target frame image; $\lambda_1$ may represent a coefficient corresponding to $Din_{n(n)}$ in a case that a first grayscale of the $n^{th}$ pixel in the input target frame image is in a range of $C_0$ to $C_1$; $\lambda_2$ may represent a coefficient corresponding to $Din_{n(n)}$ in the case that a grayscale of the $n^{th}$ pixel in the target frame image is in a range $C_1$ to $C_2$. By analogy, $\lambda_m$ may represent a coefficient corresponding to $Din_{n(n)}$ in the case that a grayscale of the $n^{th}$ pixel in the target frame image is in a range of $C_{m-1}$ to $C_m$. $Dout(n)_{(n)}$ may represent the transformed second grayscale of the $n^{th}$ pixel corresponding to the negative polarity in the target frame image. m may represent the number of sub-intervals. In an example, $C_0$ may be zero and $C_m$ may be 255.

It should be noted that the division of sub-intervals and the coefficients in steps S141 and S151 may be different. It is understood that how to transform the plurality of first grayscales of the display data having the positive and negative polarity is not limited in the present disclosure.

By establishing an image characteristic segmentation function and adjusting images based on different polarities of data signal of a panel, transformation of grayscales of the target frame image can be flexibly configured in the embodiments of the present disclosure, thereby dynamically and adaptively adjusting the voltage value of the second supply voltage under different application and further saving power consumption.

Figure 2:
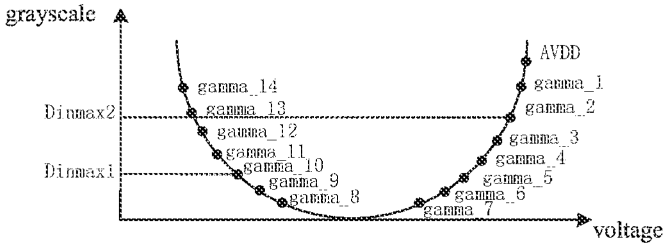
FIG. 2 is a schematic view before grayscale transformation according to an embodiment of the present disclosure.
Figure 3:
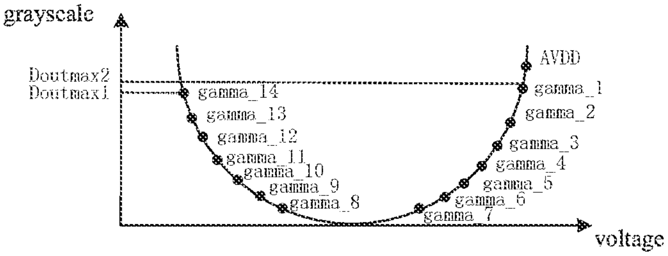
FIG. 3 is a schematic view after grayscale transformation according to an embodiment of the present disclosure.

FIG. 2 is a schematic view before grayscale transformation according to an embodiment of the present disclosure, and FIG. 3 is a schematic view after grayscale transformation according to an embodiment of the present disclosure.

As shown in FIGS. 2 and 3, a horizontal axis may denote a voltage and a longitudinal axis may denote a grayscale. In FIG. 2, it can be seen that before transformation of first grayscale transformation, a first grayscale of the target frame image corresponding to a positive polarity may have a maximum value corresponding to Level 10 gamma voltage; and a first grayscale of the target frame image corresponding to a negative polarity may have a maximum value corresponding to Level 2 gamma voltage. In FIG. 3, it can be seen that after transforming the first grayscale according to the positive polarity and the negative polarity, a second grayscale of the target frame image corresponding to the positive polarity may have a maximum value corresponding to Level 14 gamma voltage; and a second grayscale of the target frame image corresponding to the negative polarity may have a maximum value corresponding to Level 1 gamma voltage. That is, the maximum value of transformed grayscales of the target frame image corresponding to the positive and negative polarity may be larger than the maximum value of the grayscales before transformation.

By transforming the first grayscale according to the polarity of the display data and adjusting the preset voltage value of the first power supply voltage, it is possible to find a minimum voltage value of the first power supply voltage required to ensure optimal display, and the minimum voltage value of the first power supply voltage is used as the voltage value of the second power supply voltage that may be adjusted more finely, thereby further reducing energy consumption of the display panel while ensuring the display effect of the display panel.

Step S2: adjusting a voltage value of a first supply voltage of the display according to the grayscale extreme value to obtain a voltage value of a second supply voltage;

Further, the step of adjusting the voltage value of the first power supply voltage of the display according to the grayscale extreme value to obtain the voltage value of the second power supply voltage comprises following steps:

Step S21: determining a voltage value of a gamma reference voltage corresponding to a current polarity according to the first grayscale positive extreme value and the first grayscale negative extreme value;

Step S22: adjusting the voltage value of the first power supply voltage according to the voltage value of the gamma reference voltage corresponding to the current polarity to obtain the voltage value of the second power supply voltage.

Wherein the step of adjusting the voltage value of the first power supply voltage of the display according to the grayscale extreme value comprises: determining the voltage value of the gamma reference voltage corresponding to the current polarity according to the first grayscale positive extreme value and the first grayscale negative extreme value, and then adjusting the voltage value of the first power supply voltage according to the voltage value of the gamma reference voltage corresponding to the current polarity to obtain the voltage value of the second power supply voltage. Each level of first gamma voltages is associated with a voltage value of the gamma reference voltage, so where a voltage value of a new gamma reference voltage is re-determined, other level of first gamma voltages is adjusted as a whole synchronously.

In an example, 14 levels of gamma (i.e., gamma) voltages are pre-stored in the drive module, and each level of gamma voltage may correspond to one grayscale (i.e., gray). For example, the gamma voltage corresponding to a grayscale of 0 may be Level 1 gamma voltage, i.e., gamma_1; the gamma voltage corresponding to a grayscale of 228 may be Level 14 gamma voltage, i.e., gamma_14. Further, 14 levels of gamma voltages may correspond to one of voltage values of the first power supply voltage (i.e., AVDD voltage). It should be noted that a plurality of sets of gamma voltages may be provided in the drive module, and each set of gamma voltages may include 14 levels of gamma voltages. It is understood that the correspondence among the grayscale, gamma voltage, and voltage value of the first power supply voltage is not limited in the present disclosure.

Further, the voltage value of the gamma reference voltage includes a voltage value of a gamma reference positive voltage and a voltage value of a gamma reference negative voltage. It should be noted that the voltage value of the gamma reference positive voltage and the voltage value of the gamma reference negative voltage in the embodiments of the present disclosure are related to the polarity of display data, and not intended to specify voltage symbols of the voltage value of the gamma reference positive voltage and the voltage value of the gamma reference negative voltage in the actual application.

Further, the step of determining the voltage value of the gamma reference voltage corresponding to the current polarity according to the first grayscale positive extreme value and the first grayscale negative extreme value comprises following steps:

- Step S211: determining a voltage value of a first gamma positive voltage corresponding to the first grayscale positive extreme value according to the first grayscale positive extreme value;
- Step S212: determining a voltage value of a first gamma negative voltage corresponding to the first grayscale negative extreme value according to the first grayscale negative extreme value;
- Step S213: determining a voltage value of a gamma reference positive voltage corresponding to a current positive polarity according to the voltage value of the first gamma positive voltage;
- Step S214: determining a voltage value of a gamma reference negative voltage corresponding to a current negative polarity according to the voltage value of the first gamma negative voltage.

Further, the step of determining the voltage value of the first gamma positive voltage corresponding to the first grayscale positive extreme value according to the first grayscale positive extreme value can be represented by a following equation (3):

$$\text{gamma\_num}=f1(Din_{(p)max}), \tag{3}$$

Where $Din_{(p)max}$ may represent the first grayscale positive extreme value of the input target frame image; gamma_num denotes a gamma voltage (i.e., a voltage value of the first gamma positive voltage) corresponding to the first grayscale positive extreme value of the target frame image. num may represent the level of gamma voltages, for example, gamma_num may be gamma_1 or gamma_3.

Further, the step of determining the voltage value of the first gamma negative voltage corresponding to the first grayscale negative extreme value according to the first grayscale negative extreme value can be represented by a following equation (4):

$$\text{gamma\_num}'=f2(Din_{(n)max}), \tag{4}$$

Where $Din_{(n)max}$ may represent a first grayscale negative extreme value of the input target frame image; gamma_num' denotes a gamma voltage (i.e., a voltage value of the first gamma negative voltage) corresponding to the first grayscale negative extreme value of the target frame image. num may represent the level of gamma voltages.

Further, the preset voltage value of the first power supply voltage may be represented by a string of binary numbers, for example, 1010 may represent that the voltage value of the first power supply voltage is 10 V. The preset voltage value of the first power supply voltage may be pre-stored in a memory. It is understood that the present disclosure does not limit the expression manner of the voltage value of the power supply voltage.

Further, the voltage value of the gamma reference voltage may be used to determine the voltage value of the second power supply voltage. The step of determining the voltage value of the gamma reference positive voltage corresponding to the current positive polarity according to the voltage value of the first gamma positive voltage may be represented by a following equation (5):

$$\text{gamma\_ref}=f3(\text{gamma\_num}), \tag{5}$$

Where gamma_ref represents the voltage value of the gamma reference positive voltage corresponding to the current positive polarity, and gamma_num represents the voltage value of the first gamma positive voltage corresponding to the first grayscale positive extreme value of the target frame image.

Further, the step of determining the voltage value of the gamma reference negative voltage corresponding to the current negative polarity according to the voltage value of the first gamma negative voltage may be represented by a following equation (6):

$$\text{gamma\_ref}'=f4(\text{gamma\_num}'), \tag{6}$$

Where gamma_ref' represents the voltage value of the gamma reference negative voltage corresponding to the current negative polarity, and gamma_num' represents the voltage value of the first gamma negative voltage corresponding to the first grayscale negative extreme value of the target frame image.

It should be noted that the target frame image of the embodiments of the present disclosure can be displayed in multiple frames. Frames corresponding to positive polarity and frames corresponding to negative polarity may be alternately performed. That is, if a current frame corresponds to display data of a positive polarity, the voltage value of the gamma reference positive voltage corresponding to the current positive polarity is determined according to the voltage value of the first gamma positive voltage; if the next frame corresponds to display data of a negative polarity, the voltage value of the gamma reference negative voltage corresponding to the current negative polarity is determined according to the voltage value of the first gamma negative voltage.

Further, the step of adjusting the voltage value of the first power supply voltage according to the voltage value of the gamma reference voltage corresponding to the current polarity to obtain the voltage value of the second power supply voltage comprises following steps:

Step S221: determining a distribution of gamma voltages according to the voltage value of the gamma reference voltage corresponding to the current polarity;

Step S222: adjusting the voltage value of the first power supply voltage according to the distribution of gamma voltages to obtain the voltage value of the second power supply voltage.

Further, the step of adjusting the voltage value of the first power supply voltage according to the voltage value of the gamma reference voltage corresponding to the current polarity to obtain the voltage value of the second power supply voltage may be represented by a following equation (7):

$$AVDD'=f5(V\_gamma,gamma\_refer), \tag{7}$$

Where AVDD' denotes the voltage value of the second power supply voltage obtained by adjusting the preset voltage value of the first power supply voltage. V_gamma may represent a distribution of the gamma voltage, for example, a positive extreme value of the second gamma voltage corresponding to the positive polarity, or of course, a negative extreme value of the second gamma voltage corresponding to the positive polarity. gamma_refer may be determined according to the polarity of the display data corresponding to the current frame, that is, the gamma_refer may be either gamma_ref or gamma_ref'.

Further, AVDD' may be greater than the maximum value gamma_max of the plurality of second gamma voltages, and may be represented by a following equation (8):

$$AVDD'=gamma\_max+\Delta V, \tag{8}$$

Where ΔV may be greater than 0, indicating a difference between AVDD' and gamma_max. ΔV may be determined according to circumstances, but is not limited here.

It should be noted that, in the embodiments of the present disclosure, the functions f1, f2, f3, f4, and f5 may be same or different. It is understood that, in practical applications, corresponding functions may be created according to actual needs, and the present disclosure does not limit functions f1, f2, f3, f4, and f5.

By detecting the polarity of the display data of the target frame image, determining the maximum gamma voltage value corresponding to the grayscale data of different polarities, determining a new voltage value of the gamma reference voltage by analyzing gamma, and determining the voltage value of the second power supply voltage according to the new voltage value of the gamma reference voltage as the minimum voltage value required to satisfy the optimal display, the embodiments of the present disclosure can dynamically adjust a power supply configuration of a display system thereby achieving the target of reducing the power consumption of the display, while ensuring the image quality and avoiding the image flicker problem.

Step S3: driving the display for displaying according to the voltage value of the second power supply voltage and the display data of the target frame image.

Wherein, the embodiments of the present disclosure determine the minimum voltage value of the second power supply voltage according to the polarity corresponding to each frame of the target frame image, and adjust both the positive polarity and negative polarity accordingly, so that the voltage value of the second power supply voltage can be adjusted more finely, and the energy consumption of the display panel is further reduced while the quality of the display image is ensured.

Further, the method for driving the display further comprises following steps:

Step S4: adjusting a driving power of the display panel according to the voltage value of the second power supply voltage.

For example, the driving power of the display panel may be adjusted according to the voltage value of the second power supply voltage, and represented by a following equation (9):

$$Power=AVDD'*I, \tag{9}$$

Where Power may represent a power of the display panel according to the embodiments of the present disclosure, and I may represent a current corresponding to AVDD'. Since AVDD' may be minimized while maintaining the display quality in the driving manner of the present disclosure, it is possible to further reduce energy consumption of the display panel while ensuring the display effect of the display panel.

Figure 4:
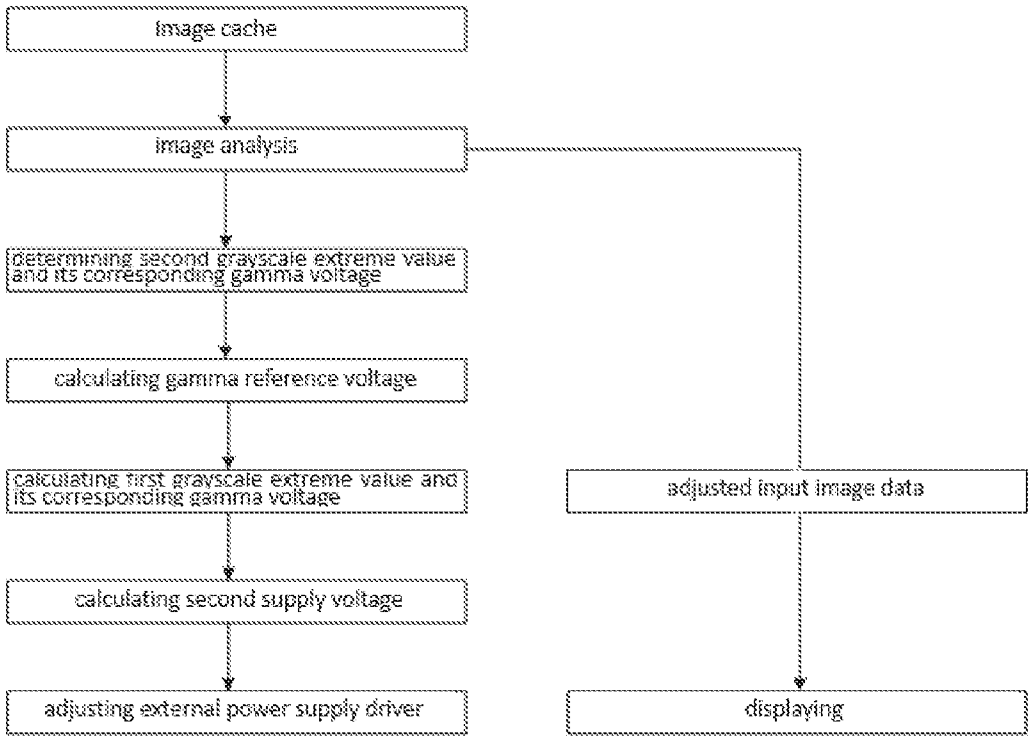
FIG. 4 is a schematic view of a method for driving a display according to an embodiment of the present disclosure.

FIG. 4 is a schematic view of a method for driving of a display according to an embodiment of the present disclosure.

As shown in FIG. 4, in the embodiment of the present disclosure, as an example, an input image data may be first cached, then perform an image analysis to find a first grayscale range of the target frame image and a first grayscale extreme value (including a first grayscale positive extreme value and a first grayscale negative extreme value) of the target frame image, and an input display data may be adjusted according to the first grayscale range of the target frame image to obtain the adjusted input image data and a plurality of second grayscales. Then, a second grayscale extreme value and a second gamma voltage corresponding to the second grayscale extreme value can be found among the plurality of second grayscales, and a voltage value of a gamma reference voltage (including a voltage value of a gamma reference positive voltage and a voltage value of a gamma reference negative voltage) may be calculated. Meanwhile, a first grayscale extreme value and a first gamma voltage corresponding to the first grayscale extreme value may be calculated. Finally, the adjusted AVDD value (i.e., a voltage value of a second power supply voltage) is calculated, together with the adjusted input image data, to drive the display panel for image display. It is understood that the implementation steps of the embodiments of the present disclosure are not limited to the sequence in FIG. 4.

The present disclosure further provides a display, the display comprises a grayscale acquisition module electrically connected to a power supply regulation module, for determining a grayscale extreme value corresponding to a polarity of display data of a target frame image according to the polarity; a power supply regulation module electrically connected to the grayscale acquisition module and a display module, for adjusting a voltage value of a first power supply voltage of the display according to the grayscale extreme value to obtain a voltage value of a second power supply voltage; the display module electrically connected to the power supply regulation module for driving the display for displaying according to the voltage value of the second power supply voltage and the display data of the target frame image.

Figure 5:
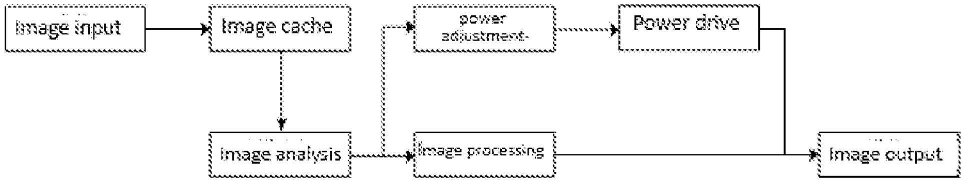
FIG. 5 is a structural schematic view of a display according to an embodiment of the present disclosure.

FIG. 5 is a schematic structural diagram of a display according to an embodiment of the present disclosure.

As shown in FIG. 5, the input image may be image cached. Wherein the image cache may be implemented in a register. The image cache may read and cache display data of a pre-stored target frame. When the image cache receives an instruction from a system to start image processing, the image cache may send display data of the cached target frame to an image analysis for analysis.

Further, the image analysis may receive the display data of the target frame sent from the image cache, and analyze the display data of the target frame. Since there is a non-linear relationship between the visual perception and the brightness in the image, the visual perception may be characterized by a lightness value that can be observed by the human eye, and the brightness may be characterized by a brightness factor. Therefore, based on the non-linear relationship between the visual perception and the brightness in the image, each pixel of the target frame image may be statistically analyzed to obtain a range of the lightness value of the target frame image. Of course, a grayscale of the target frame image may be statistically analyzed to obtain a range of the grayscale.

Further, based on the non-linear relationship between the visual perception and the brightness in the image, the grayscale of the target frame image may be segmented according to the polarity, and a first grayscale may be transformed by using a piecewise function to obtain the transformed second grayscale corresponding to a different polarity.

Further, the output of a power supply drive, together with the data subjected to an image compensation, may control the final image output. It is understood that the structure in FIG. 5 is exemplary and that the present disclosure does not limit the specific structure of the display.

As described above, by determining the grayscale extreme value corresponding to the polarity according to the polarity of display data of the target frame image, then adjusting the voltage value of the first power supply voltage of the display according to the grayscale extreme value to obtain the voltage value of the second power supply voltage, and finally driving the display for displaying according to the voltage value of the second power supply voltage and the display data of the target frame image, the embodiments of the present disclosure may dynamically and adaptively adjust the voltage value of the second power supply voltage according to the polarity of the display data, thereby effectively avoiding the image flicker problem and further reducing the energy consumption of the display panel while ensuring the display image performance.

In the above embodiments, the description of each embodiment has its own focus, and the parts that are not described in detail in a certain embodiment can refer to the relevant descriptions of other embodiments.

The display and the method for driving the display provided in the embodiments of the present disclosure are described in detail above. Specific examples are applied to illustrate the principle and implementation of the present disclosure herein. The description of the above embodiments is only used to help understand the technical solutions and core ideas of the present disclosure; those of ordinary skill in the art should understand that it is still possible to modify the technical solutions recorded in the foregoing embodiments, or equivalently replace some of the technical features therein; and these modifications or replacements do not cause the essence of the corresponding technical solutions to deviate from the scope of the technical solutions of the embodiments of the present disclosure.

What is claimed is:

1. A method for driving a display device, the method comprising following steps:

determining a grayscale extreme value corresponding to a polarity of display data of a target frame image according to the polarity, wherein the grayscale extreme value comprises a first grayscale positive extreme value and a first grayscale negative extreme value;

transforming a plurality of first grayscales of positive polarity display data to obtain a second grayscale positive extreme value corresponding to a positive polarity;

and transforming a plurality of first grayscales of negative polarity display data to obtain a second grayscale negative extreme value corresponding to a negative polarity;

adjusting a voltage value of a first power supply voltage of the display device to obtain a voltage value of a second power supply voltage, comprising:

adjusting a voltage value of a gamma reference voltage corresponding to the positive polarity or the negative polarity according to each of the first grayscale positive extreme value and the first grayscale negative extreme value; and adjusting the voltage value of the first power supply voltage according to the voltage value of the gamma reference voltage corresponding to the positive polarity or the negative polarity, a second gamma voltage positive extreme value, and a second gamma voltage negative extreme value, wherein the second gamma voltage positive extreme value is obtained based on the second grayscale positive extreme value, and the second gamma voltage negative extreme value is obtained based on the second grayscale negative extreme value, to obtain the voltage value of the second power supply voltage; and driving the display device for displaying according to the voltage value of the second power supply voltage and the display data of the target frame image.

2. The method for driving the display device according to claim 1, wherein the step of transforming the plurality of first grayscales of the positive polarity display data to obtain the second grayscale positive extreme value corresponding to the positive polarity comprises following steps:

transforming the plurality of first grayscales of the positive polarity display data to obtain a plurality of transformed second grayscales corresponding to the positive polarity; and obtaining the second grayscale positive extreme value corresponding to the positive polarity according to the plurality of transformed second grayscales corresponding to the positive polarity.

3. The method for driving the display device according to claim 1, wherein the step of transforming the plurality of first grayscales of the negative polarity display data to obtain the second grayscale negative extreme value corresponding to the negative polarity comprises following steps:

transforming the plurality of first grayscales of the negative polarity display data to obtain a plurality of transformed second grayscales corresponding to the negative polarity; and obtaining the second grayscale negative extreme value corresponding to the negative polarity according to the plurality of transformed second grayscales corresponding to the negative polarity.

4. The method for driving the display device according to claim 1, wherein the voltage value of the gamma reference voltage comprises a voltage value of a gamma reference positive voltage and a voltage value of a gamma reference negative voltage, and the step of determining the voltage value of the gamma reference voltage corresponding to the positive polarity or the negative polarity according to each of the first grayscale positive extreme value and the first grayscale negative extreme value comprises following steps:

determining a voltage value of a first gamma positive voltage corresponding to the first grayscale positive extreme value according to the first grayscale positive extreme value;

determining a voltage value of a first gamma negative voltage corresponding to the first grayscale negative extreme value according to the first grayscale negative extreme value;

determining the voltage value of the gamma reference positive voltage corresponding to the positive polarity according to the voltage value of the first gamma positive voltage; and determining the voltage value of the gamma reference negative voltage corresponding to the negative polarity according to the voltage value of the first gamma negative voltage.

5. The method for driving the display device according to claim 1, wherein the step of adjusting the voltage value of the first power supply voltage according to the voltage value of the gamma reference voltage corresponding to the positive polarity or the negative polarity, the second gamma voltage positive extreme value, and the second gamma voltage negative extreme value, to obtain the voltage value of the second power supply voltage comprises following steps:

determining a gamma voltage distribution according to the voltage value of the gamma reference voltage corresponding to the positive polarity or the negative polarity; and adjusting the voltage value of the first power supply voltage according to the gamma voltage distribution to obtain the voltage value of the second power supply voltage.

6. The method for driving the display device according to claim 1, wherein the method for driving the display device further comprises a following step: adjusting a driving power of a display panel according to the voltage value of the second power supply voltage.

7. The method for driving the display device according to claim 1, wherein the first grayscale positive extreme value is a maximum value of the plurality of first grayscales of the target frame image corresponding to the positive polarity, and the first grayscale negative extreme value is a maximum value of the plurality of first grayscales of the target frame image corresponding to the negative polarity.

8. The method for driving the display device according to claim 1, wherein an absolute value of the second grayscale positive extreme value corresponding to the positive polarity is different from an absolute value of the first grayscale positive extreme value, and an absolute value of the second grayscale negative extreme value corresponding to the negative polarity is different from an absolute value of the first grayscale negative extreme value.

9. The method for driving the display device according to claim 8, wherein the absolute value of the second grayscale positive extreme value corresponding to the positive polarity is greater than the absolute value of the first grayscale positive extreme value, and the absolute value of the second grayscale negative extreme value corresponding to the negative polarity is greater than the absolute value of the first grayscale negative extreme value.

10. The method for driving the display device according to claim 1, wherein the voltage value of the second power supply voltage is greater than an absolute value of the second gamma voltage positive extreme value or the second gamma voltage negative extreme value.

11. A display device comprising a drive and a display panel electrically connected to the drive, wherein the drive is configured to execute:

determining a grayscale extreme value corresponding to a polarity of display data of a target frame image according to the polarity, wherein the grayscale extreme value comprises a first grayscale positive extreme value and a first grayscale negative extreme value;

transforming a plurality of first grayscales of positive polarity display data to obtain a second grayscale positive extreme value corresponding to a positive polarity; and transforming a plurality of first grayscales of negative polarity display data to obtain a second grayscale negative extreme value corresponding to a negative polarity;

adjusting a voltage value of a first power supply voltage of the display device to obtain a voltage value of a second power supply voltage, comprising:

adjusting a voltage value of a gamma reference voltage corresponding to the positive polarity or the negative polarity according to each of the first grayscale positive extreme value and the first grayscale negative extreme value; and adjusting the voltage value of the first power supply voltage according to the voltage value of the gamma reference voltage corresponding to the positive polarity or the negative polarity, a second gamma voltage positive extreme value, and a second gamma voltage negative extreme value, wherein the second gamma voltage positive extreme value is obtained based on the second grayscale positive extreme value, and the second gamma voltage negative extreme value is obtained based on the second grayscale negative extreme value, to obtain the voltage value of a second power supply voltage; and driving the display device for displaying according to the voltage value of the second power supply voltage and the display data of the target frame image.

12. The display device according to claim 11, wherein the transforming the plurality of first grayscales of the positive polarity display data to obtain the second grayscale positive extreme value corresponding to the positive polarity comprises following steps:

transforming the plurality of first grayscales of the positive polarity display data to obtain a plurality of transformed second grayscales corresponding to the positive polarity; and obtaining the second grayscale positive extreme value corresponding to the positive polarity according to the plurality of transformed second grayscales corresponding to the positive polarity.

13. The display device according to claim 11, wherein the transforming the plurality of first grayscales of the negative polarity display data to obtain the second grayscale negative extreme value corresponding to the negative polarity comprises following steps:

transforming the plurality of first grayscales of the negative polarity display data to obtain a plurality of transformed second grayscales corresponding to the negative polarity; and obtaining the second grayscale negative extreme value corresponding to the negative polarity according to the plurality of transformed second grayscales corresponding to the negative polarity.

14. The display device according to claim 11, wherein the voltage value of the gamma reference voltage comprises a voltage value of a gamma reference positive voltage and a voltage value of a gamma reference negative voltage, and the determining the voltage value of the gamma reference voltage corresponding to the positive polarity or the negative polarity according to each of the first grayscale positive extreme value and the first grayscale negative extreme value comprises following steps:

determining a voltage value of a first gamma positive voltage corresponding to the first grayscale positive extreme value according to the first grayscale positive extreme value;

determining a voltage value of a first gamma negative voltage corresponding to the first grayscale negative extreme value according to the first grayscale negative extreme value;

determining the voltage value of the gamma reference positive voltage corresponding to the positive polarity according to the voltage value of the first gamma positive voltage; and determining the voltage value of the gamma reference negative voltage corresponding to the negative polarity according to the voltage value of the first gamma negative voltage.

15. The display device according to claim 11, wherein the adjusting the voltage value of the first power supply voltage according to the voltage value of the gamma reference voltage corresponding to the positive polarity or the negative polarity, the second gamma voltage positive extreme value, and the second gamma voltage negative extreme value, to obtain the voltage value of the second power supply voltage comprises following steps:

determining a gamma voltage distribution according to the voltage value of the gamma reference voltage corresponding to the positive polarity or the negative polarity; and adjusting the voltage value of the first power supply voltage according to the gamma voltage distribution to obtain the voltage value of the second power supply voltage.

16. The display device according to claim 11, wherein the drive is configured to further execute adjusting a driving power of a display panel according to the voltage value of the second power supply voltage.

17. The display device according to claim 11, wherein the first grayscale positive extreme value is a maximum value of the plurality of first grayscales of the target frame image corresponding to the positive polarity, and the first grayscale negative extreme value is a maximum value of the plurality of first grayscales of the target frame image corresponding to the negative polarity.

18. The display device according to claim 11, wherein an absolute value of the second grayscale positive extreme value corresponding to the positive polarity is different from an absolute value of the first grayscale positive extreme value, and an absolute value of the second grayscale negative extreme value corresponding to the negative polarity is different from an absolute value of the first grayscale negative extreme value.

19. The display device according to claim 18, wherein the absolute value of the second grayscale positive extreme value corresponding to the positive polarity is greater than the absolute value of the first grayscale positive extreme value, and the absolute value of the second grayscale negative extreme value corresponding to the negative polarity is greater than the absolute value of the first grayscale negative extreme value.

20. The display device according to claim 11, wherein the voltage value of the second power supply voltage is greater than an absolute value of the second gamma voltage positive extreme value or the second gamma voltage negative extreme value.

* * * * *